US008705449B2

(12) United States Patent
Fracchia

(10) Patent No.: US 8,705,449 B2
(45) Date of Patent: Apr. 22, 2014

(54) METHOD AND SYSTEM FOR COOPERATIVE TRANSMISSION OF A VIDEO SEQUENCE

(75) Inventor: Roberta Fracchia, Colombes (FR)

(73) Assignee: Thales, Neuilly sur Seine (FR)

(*) Notice: Subject to any disclaimer, the term of this patent is extended or adjusted under 35 U.S.C. 154(b) by 335 days.

(21) Appl. No.: 13/053,741

(22) Filed: Mar. 22, 2011

(65) Prior Publication Data

US 2011/0285915 A1    Nov. 24, 2011

(30) Foreign Application Priority Data

Mar. 23, 2010  (FR) ..................... 10 01138

(51) Int. Cl.
H04W 4/00 (2009.01)

(52) U.S. Cl.
USPC ..................... 370/328; 455/426.1

(58) Field of Classification Search
None
See application file for complete search history.

(56) References Cited

U.S. PATENT DOCUMENTS

| 2009/0146822 | A1* | 6/2009 | Soliman | 340/573.1 |
|---|---|---|---|---|
| 2010/0322351 | A1* | 12/2010 | Tang et al. | 375/316 |
| 2012/0005304 | A1* | 1/2012 | Guo et al. | 709/217 |
| 2012/0184305 | A1* | 7/2012 | Betts et al. | 455/457 |
| 2012/0184322 | A1* | 7/2012 | Falconetti et al. | 455/524 |
| 2012/0231739 | A1* | 9/2012 | Chen et al. | 455/41.2 |

OTHER PUBLICATIONS

Cheng-Gang Wang et al: "Based on MBMS: A General Structure Design of Relay Network for Cellular System", Wireless Communications, Networking and Mobile Computing, 2009. WICOM '09. 5th International Conference on, IEEE, Piscataway, NJ, USA, Sep. 24, 2009, pp. 1-4, XP031555764, ISBN: 978-1-4244-3692-7 pp. 1-4, XP031555764, ISBN: 978-1-4244-3692-7.
Hausl et al. "Relay Communication with Hierarchical Modulation", IEEE Communications Letters, vol. 11, No. 1, pp. 64-66 (2007).
Alay et al., "Implementing a Cooperative MAC Protocol for Wireless Video Multicast," Wireless Communications and Networking Conference, IEEE (2009) 6 pages.
French Application No. FR1001138: International Search Report and Written Opinion, and references cited therein, 7 pages (2011).
Liu et al., "A MAC-PHY Cross-Layer Protocol for Wireless Ad-Hoc Networks," Wireless Communications and Networking Conference, IEEE (2008) 6 pages.
Shutoy et al., "Cooperative Source and Channel Coding for Wireless Multimedia Communications," IEEE Journal of Selected Topics in Signal Processing, IEEE (2007) 13 pages.
Xu et al., "Layered Cooperative Source and Channel Coding," IEEE International Conference on Seoul, Korea, IEEE (2005) 5 pages.

* cited by examiner

Primary Examiner — Chi Pham
Assistant Examiner — Mohammad Adhami
(74) Attorney, Agent, or Firm — McDermott Will & Emery LLP

(57) ABSTRACT

The method for transmitting a video sequence from a transmitting terminal (1) including at least one short-range radio interface and one long-range radio interface towards at least one receiving terminal (5) comprises the steps of segmenting the video sequence into a base layer, making it possible to obtain a low-quality video sequence, and at least one improvement layer, complementary to the base layer, and making it possible, in combination with the base layer, to obtain a better quality video sequence, transmission by the long-range radio interface of the transmitting terminal (1) of at least the entire base layer towards the receiving terminal (5), transmission by the short-range radio interface (1) of at least the entire improvement layer towards at least one cooperation terminal (2) comprising at least one short-range radio interface and one long-range interface (13), and transmission, by the long-range radio interface, of said cooperation terminal (2), of at least the entire improvement layer towards the receiving terminal (5).

9 Claims, 2 Drawing Sheets

METHOD AND SYSTEM FOR COOPERATIVE TRANSMISSION OF A VIDEO SEQUENCE

The present invention relates to a method and a system for transmitting a video sequence from a transmitting terminal including at least one short-range radio interface and one long-range radio interface towards at least one receiving terminal.

It is in particular applicable to the "live" transmission of video sequences, also called "streaming," the video data being consumed, for example viewed, as it is received by the recipient.

This video data has the characteristic of having a limited useful lifetime, the data having to be received and processed by the recipient before a certain deadline, which is the moment at which that data is required to be viewed. After that deadline, the data becomes useless.

Thus, to be sent over a limited bandwidth network, for example a radio connection, a video sequence must be compressed, so as to ensure an acceptable reception quality.

Known from the document "Cellular Controlled Short-Range Communication for Cooperative P2P Networking" (Frank H. P. Fitzek et al., WWRF 17, 2006) is a method that combines short-range and long-range radio communication technologies to increase the data transmission throughput from a base station towards at least two receiving terminals able to exchange data according to a short-range communication, while reducing the consumption of energy needed for that transmission.

Throughout the entire description and the claims, "short-range radio connection" refers to a connection of the WLAN type, for example a Wi-Fi connection, established over a maximum distance of about several hundred meters. Moreover, "long-range radio connection" refers to a radio connection of the WAN type, for example a WiMAX connection, over a range that can reach several tens of kilometers.

According to this method, instead of sending the same data to each of the receiving terminals using a long-range communication, the base station sends each receiving terminal a different part of the data, then each of the receiving terminals sends the other terminals the data it has received, via a short-range communication.

However, in the case of the transmission of a video sequence from a mobile terminal, the resolution of the transmitted sequence is most often limited by the possible throughput in upstream connection of the mobile terminal. Indeed, the radio transmission strength of each radio interface of a mobile terminal is limited, both due to the lifetime of the battery, and to ensure compliance with a standard setting the maximum allowed specific absorption rate (SAR), i.e. the maximum level of radiofrequencies emitted by each radio interface. For example, for a mobile terminal provided with a WiMAX radio interface, the maximum flow in downstream connection is 5.76 Mbps, whereas it is only 115 kbps in upstream connection, i.e. about 50 times weaker.

Furthermore, in order to avoid the interference caused by simultaneous transmission and reception, each frame of a long-range WAN connection, the duration of which is in the vicinity of several milliseconds, is made up of a descending frame, during which the terminal receives data packets, and an ascending frame, during which the terminal transmits data packets. Each of the descending and ascending frames has a predetermined duration, such that the terminal can only transmit data during fixed periods.

As a result, the "streaming" transmission of a video sequence with a good resolution from a mobile terminal via a radio connection is generally impossible.

Several solutions have been proposed to resolve this problem. Patent WO02/17043 describes a method for sending a message, for example a video, from a transmitting terminal to a receiving terminal, both equipped with several radio interfaces using different technologies such as GPRS or CDMA. According to this method, the message is split into several sets of data packets, and each of these sets is sent via a different radio interface of the same transmitting terminal towards the same receiving terminal. Then, after receiving all of the fragments, the receiving terminal recombines them to obtain the original message.

This method certainly makes it possible to multiply the upstream connection from the transmitting terminal, but it requires, for the throughput gain to be significant, that this terminal and the network access point be equipped with several radio interfaces using different technologies. However, the current terminals rarely have more than two radio interfaces with different technologies, and the network access points are generally not provided with radio interfaces using different technologies.

Similarly, application US 2008/0130496 discloses a method for sending a video sequence from a terminal provided with a plurality of transmitters towards a server. The terminal generates, from the sequence, several data packets, which are sent by the various transmitters via a plurality of channels of a 3G network. These packets are received, then recombined by the server, which then reconstitutes the original video signal. Thus, if the terminal comprises a number N of transmitters with 3G technology, the upstream rate is multiplied by a factor N.

However, the current terminals are generally not equipped with more than one radio interface using a given technology. The implementation of this method therefore requires a substantial material modification to the existing terminals. Moreover, this method involves substantial energy consumption, due to the multiplication of transmissions on the long-range connections.

The aim of the invention is thus to allow the transmission of data from a transmitting terminal, in upstream and long-range connection, with a higher throughput than the throughput authorized by a wireless connection of the WAN type, having less significant implementation constraints than those imposed by the solutions of the state of the art.

To that end, the invention relates to a method of the aforementioned type, characterized in that it comprises the following steps:
  segmenting said video sequence into a base layer making it possible to obtain a low-quality video sequence and at least one improvement layer, complementary to said base layer, and making it possible to obtain a better quality video sequence in combination with the base layer,
  transmission, by said long-range radio interface of the transmitting terminal, of at least the entire base layer towards said receiving terminal,
  transmission, by said short-range radio interface of the transmitting terminal, of at least the entire improvement layer towards at least one cooperation terminal comprising at least one short-range radio interface and one long-range radio interface,
  transmission, by said long-range radio interface of said cooperation terminal, of at least the entire improvement layer towards said receiving terminal.

Thus, according to this cooperative transmission method, the transmitting terminal sends, at long-range, only part of the layers making up the video sequence, and calls on nearby terminals, which serve as relays, for the transmission of the other layers of the video sequence. The transmitting terminal thus uses both its long-range connection and its short-range connection to transmit the video sequence, which makes it possible to increase its upstream connection rate.

Moreover, this transmission method is advantageous from an energy perspective for the transmitting terminal, as it sends only part of the layers of the video sequence according to a long-range connection, which consumes more energy than a short-range connection.

According to other aspects, the transmission method includes one or more of the following features:

the transmission by said long-range radio interface of the transmitting terminal of at least the entire base layer towards said receiving terminal and the transmission, by said long-range radio interface of said cooperation terminal, of at least all of the improvement layer towards said receiving terminal are done concomitantly;

the method also comprises a step for initiating cooperation, comprising:

the broadcast by said short-range radio interface of the transmitting terminal of a cooperation request, and the transmission by the short-range radio interface of said cooperation terminal to said transmitting terminal of a cooperation acceptance message;

the transmission method also comprises a step for initiating the transmission, comprising the sending by said short-range radio interface of the transmitting terminal to the cooperation terminal of a message comprising connection parameters for opening, by the cooperation terminal, of a long-range connection, and connection identifiers comprising the source and destination port numbers, and an address of the transmitting terminal and the receiving terminal;

said long-range radio interface of the transmitting terminal communicates according to communication frames successively comprising descending frames and ascending frames, said transmission by the short-range radio interface of the transmitting terminal of the improvement layer towards said cooperation layer comprises a step for transmitting data towards said cooperation terminal during at least one of said descending frames, and said transmission by the long-range radio interface of the transmitting terminal of the base layer and said transmission by the long-range radio interface of said cooperation terminal of the improvement layer comprise steps for transmitting data from said base and improvement layers, respectively, during at least one of said ascending frames;

the transmission method also comprises a step for receiving said base and improvement layers by a network access point, and a step for transmission from said network access point, towards said receiving terminal, of said base and improvement layers.

The invention also relates to a system for sending a video sequence to at least one receiving terminal, comprising a transmitting terminal including at least one short-range radio interface and one long-range radio interface, and at least one cooperation terminal including at least one short-range radio interface and one long-range radio interface, characterized in that said transmitting terminal also comprises:

means for segmenting said video sequence into a base layer making it possible to obtain a deteriorated video sequence and at least one improvement layer, complementary to said base layer, means for ordering the transmission by said long-range radio interface of the transmitting terminal of at least the entire base layer towards said receiving terminal, and means for ordering the transmission by said short-range radio interface of the transmitting terminal of at least the entire improvement layer towards said cooperation terminal, and in that said cooperation terminal comprises means for ordering the transmission, by the long-range radio interface of the cooperation terminal, of at least the entire improvement layer towards said receiving terminal.

According to other aspects, the transmission method includes one or more of the following features:

said transmitting terminal also comprises means for determining the possible throughput between the long-range radio interface of the transmitting terminal and the receiving terminal;

said transmitting terminal also comprises means for generating a cooperation request and for ordering the broadcast of said request via its short-range radio interface, and said cooperation terminal comprises means for generating a cooperation acceptance message and for ordering transmission of said cooperation acceptance message to said transmitting terminal;

said transmitting terminal also comprises means for generating an information message containing the communication parameters necessary for the transmission by said cooperation terminal of said improvement layer and to order the transmission of said information message to said cooperation terminal.

The invention will be better understood in light of an example of one embodiment of the invention that will now be described in reference to the appended figures, in which:

FIG. 1 shows the overall architecture of a system in which the inventive method can be implemented.

Figure 1:
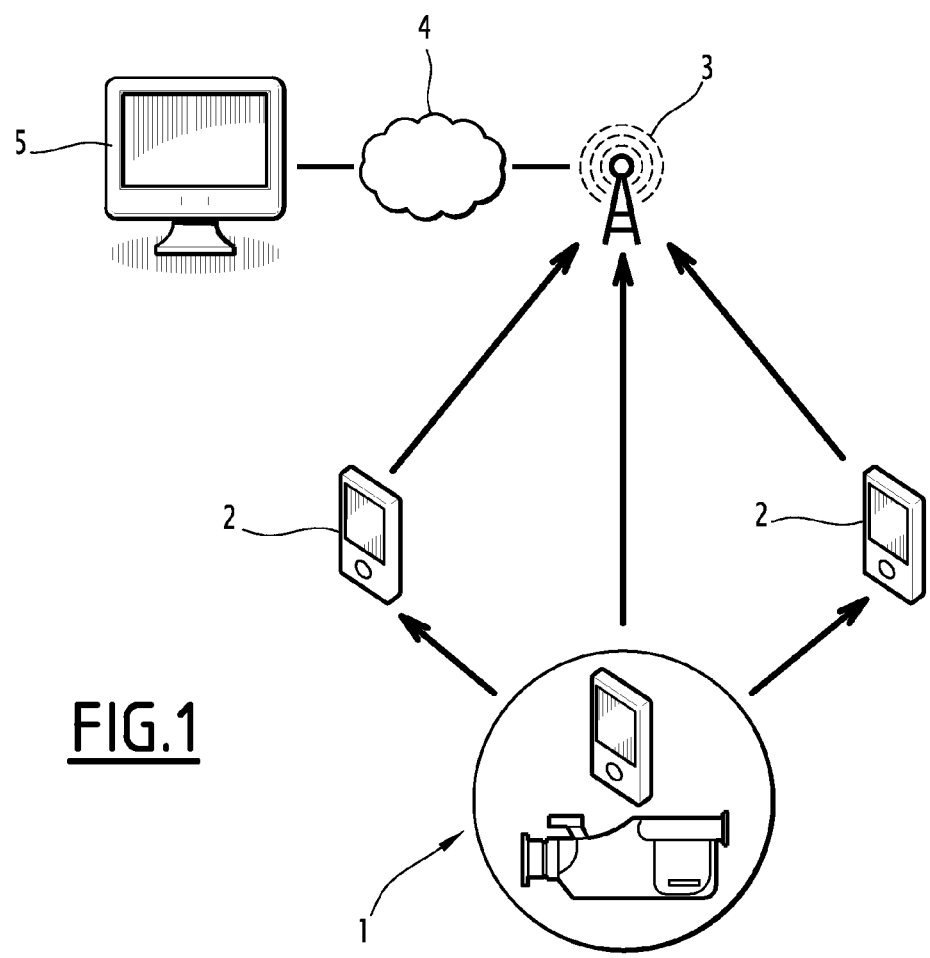
FIG. 1 is a diagram illustrating a communication network adapted to the implementation of the inventive method.

This system comprises a transmitting terminal 1, cooperation terminals 2 identical to the transmitting terminal, a network access point 3, a communication network 4, and a receiving terminal 5.

The transmitting terminal 1, hereafter called source terminal, can be any type of device including at least one long-range radio interface of the WAN type, such as a WiMAX interface according to standard IEEE 802.16, and at least one short-range radio interface of the WLAN type, for example a Wi-Fi interface according to standard IEEE 802.11g, and capable of sending a stream of data to a receiving device. As a non-limiting example, the source terminal 1 is a mobile telephone.

This source terminal 1 is capable of communicating, in transmission and reception, via a short-range connection of the WLAN type, with at least one cooperation terminal 2. In the example illustrated in FIG. 1, two cooperation terminals 2 are shown, but the number of these terminals 2 can be different. These cooperation terminals 2 are provided with a radio interface of the WLAN type using the same technology as the WLAN interface of the source terminal, and also comprising a long-range radio interface. The cooperation terminals 2 are situated at a maximum distance of several hundred meters from the source terminal 1.

The network access point 3 comprises a radio antenna using the same technology as the long-range interface of the source 1 and cooperation 2 terminals, and comprises means for transmitting data sent by the terminals 1 and 2, via the communication network 4, towards the receiving terminal 5, recipient of said data.

Figure 2:
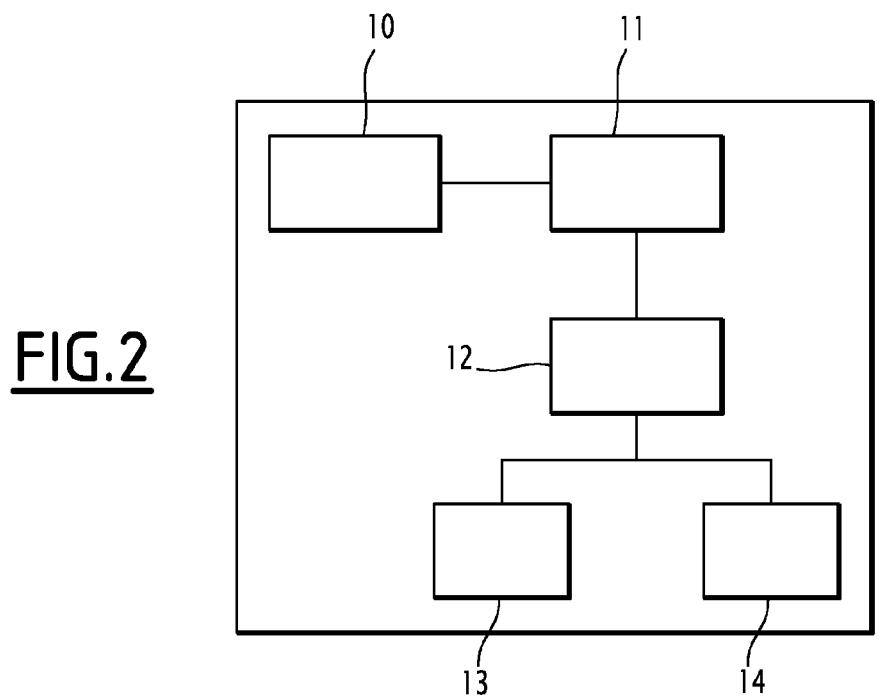
FIG. 2 is a diagram showing the architecture of transmitting and cooperation terminals adapted to implement the inventive method.

FIG. 2 shows a simplified view of the architecture of a source terminal 1 and cooperation terminals 2 adapted to the transmission of a video sequence according to the inventive transmission method.

These terminals 1 and 2 in particular comprise a video encoder 10, a decision module 11, an adaptation module 12, and at least two radio interfaces of the WAN 13 and WLAN 14 type, respectively. The video encoder 10 is connected to the decision module 11, which in turn is connected to the radio interfaces 13 and 14 via the adaptation module 12.

As an example, the WAN interface 13 is a WiMAX interface, and the WLAN interface 14 is a Wi-Fi interface using the IEEE 802.11g protocol. These radio interfaces 13 and 14 in particular comprise means for encapsulating the data to be transmitted in the form of data packets, and means for unencapsulating the data packets they receive.

The video encoder 10 is a scalable encoder, according to standard H264/SVC (Scalable Video Coding), capable of generating, from a video sequence, independent data layers, comprising a base layer, encoded according to standard H264/AVC, and at least one improvement layer. The base layer contains a low-resolution version of the video sequence, and the improvement layers making it possible to gradually improve the resolution of the sequence relative to the base layer, and can be transmitted by independent data streams. Thus, the base layer makes it possible to obtain a low-quality video sequence and the improvement layers make it possible, in combination with the base layer, to obtain a better quality video sequence.

The decision module 11 is capable of determining, when it receives data streams from the encoder 10 or the radio interfaces 13 and 14, how those streams must be managed.

The decision module 11 thus comprises means for determining the bandwidth available between the terminal and the network access point 3, and the maximum throughput that the WLAN interface 13 can transmit towards the network access point 3. The decision module 11 also comprises means for choosing, when it receives layers of video data to send towards a receiving terminal 5, what transmission mode to adopt, as a function in particular of the amount of data to be sent, the maximum throughput and the bandwidth towards the network access point 3.

The decision module 11 also comprises means for initiating a cooperative transmission, by generating a cooperation request that it sends the adaptation module 12 as well as instructions to broadcast said request via the WLAN interface 14. Upon reception of acceptance messages from terminals accepting the cooperation request, the decision module 11 can choose, from those terminals, one or more cooperation terminals.

The decision module 11 also comprises means for generating an information message, intended for cooperation terminals 2, containing the communication parameters necessary to transmit data streams towards the receiving terminal 5 via a long-range WAN connection.

Moreover, the decision module 11 is capable of sending the layers of video data to the adaptation module 12, as well as instructions to send these layers via the WAN radio interface 13 only, or via the WAN radio interface 13 and the WLAN radio interface 14, depending on the chosen transmission mode. The decision module 11 is also capable of sending the adaptation module 12 instructions to eliminate one or more layers of video data, when the set of layers generated by the encoder cannot be transmitted.

The decision module 11 thus comprises means for controlling the sending of video data layers via the WAN interface 13 during the ascending frames of the WAN interface 13 of the source terminal 1, and means for controlling the sending of the layers of video data via the WLAN interface 14 during the descending frames of the WAN interface 13 of the source terminal 1.

Moreover, the decision module 11 comprises means for deciding, as a function of criteria such as the charge level of the battery of the terminal and the availability of the terminal to establish a new communication, to accept or reject a cooperation request received by said terminal, and means for generating a cooperation acceptance message.

The adaptation module 12, in compliance with the adaptation modules of the state of the art, is capable of sending the data streams it receives from the decision module 11 towards the WAN interface 13 or the WLAN interface 14, or eliminating those streams, according to the instructions it receives from the decision module 11.

Figure 3:
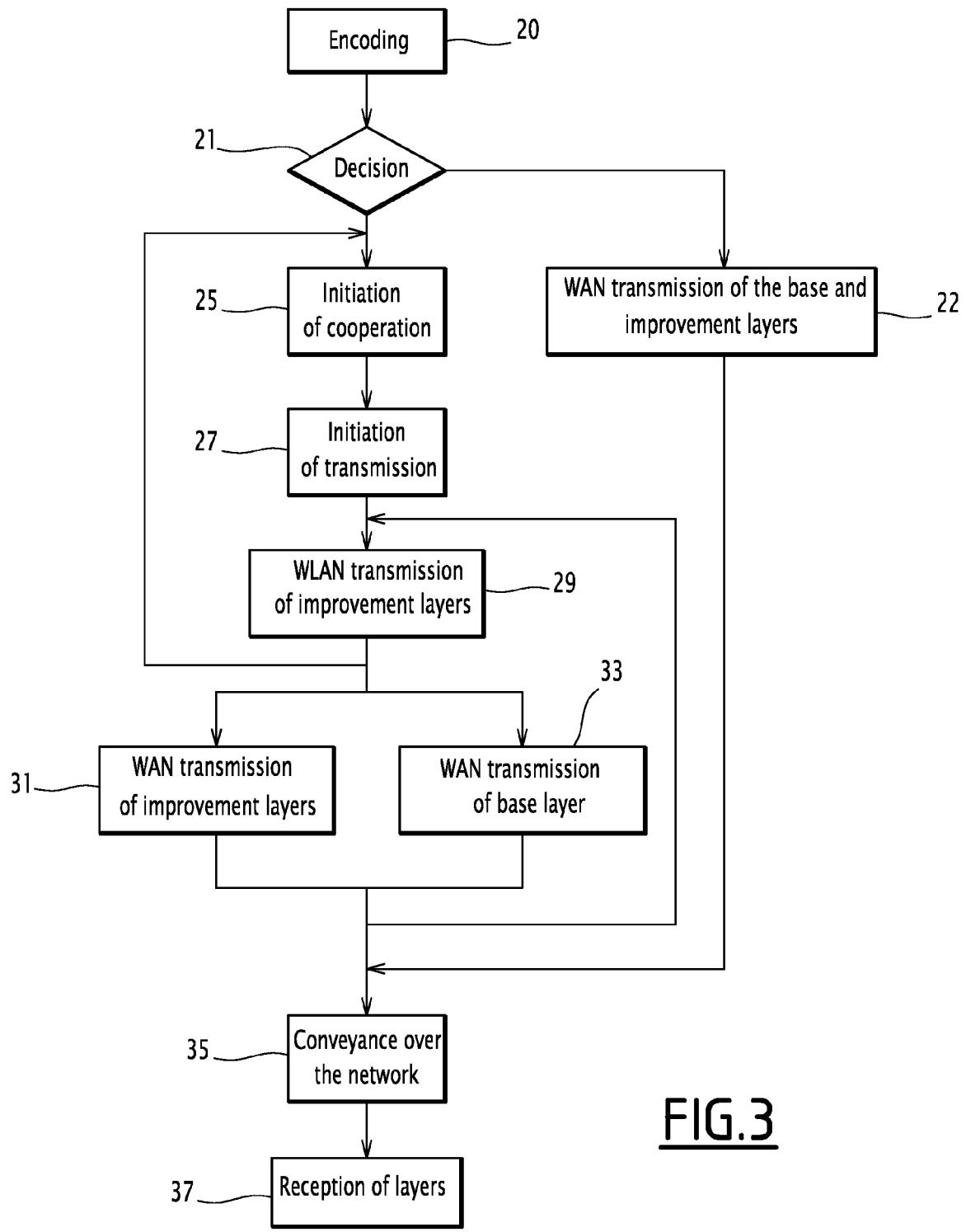
FIG. 3 is a synoptic diagram illustrating the implementation of a method for transmitting a video sequence according to one embodiment of the invention.

FIG. 3 shows a synoptic diagram illustrating the method for transmitting a video sequence according to the invention, from a source terminal 1 towards a receiving terminal 5 through a network 4 as illustrated in FIG. 1.

In a first encoding step 20 of this method, the video encoder 10 of the source terminal 1 generates, from the video sequence to be sent, $N_L$ complementary layers of video data, each comprising part of the data making up the original video sequence, which will be transmitted in the form of $N_L$ data streams. The video encoder 10 is an H264/SVC encoder, which generates a base layer during the step, encoded according to the H264/AVC standard, and at least one improvement layer.

Then, in a decision step 21, the video encoder 10 transmits the set of layers of video data to the decision module 11, and the latter determines, depending in particular on the amount of data to be sent, the possible throughput and the available bandwidth on the WAN connection 13 between the source terminal 1 and the network access point 3, which transmission mode to adopt to send these data layers.

The possible upstream connection rate from the source terminal 1 and the available bandwidth may prove insufficient for the "streaming" transmission of all of the layers of video data from the WAN radio interface 13 of the source terminal 1. In that case, during a step 22 for transmitting the layers of video data using a WAN connection, the decision module 11 transmits all of these layers to the adaptation module 12 as well as instructions to send only via the WAN interface 13. In response to this instruction, the adaptation module 12 transmits all of the layers to the WAN radio interface, and these layers are sent via the WAN radio interface 13, after adding a MAC header to the data packets making up these layers, towards the receiving terminal 5, via the network access point 3.

Alternatively, if the upstream connection rate or the available bandwidth is not sufficient for the transmission of the set of layers via the WAN connection of the source terminal 1, the decision module 11 initiates a cooperative transmission with the cooperation terminals 2. According to this cooperative transmission, only the base layer is transmitted via the WAN connection of the source terminal 1, and all or part of the improvement layers is sent via the WLAN connection of the source terminal to the cooperation terminals 2 so the latter transmit these improvement layers via their own WAN connection to the receiving terminal 5.

To that end, during a step 25 for initiating the cooperation, the decision module 11 generates a cooperation request, and this request is transmitted by the WLAN radio interface 14 by broadcasting to all of the terminals located within reach.

This request is received by the terminals provided with a suitable WLAN radio interface 14, and is transmitted to the decision module 11 of each of these terminals. Each decision module 11 then decides, as a function of criteria such as the charge level of the terminal's battery and the availability of the terminal to establish a new communication, to accept or reject the request, and each decision module 11 accepting this request sends the source terminal 1 an acceptance message, via the WLAN interface 14, using a point-to-point connection.

After sending the cooperation request, the decision module 11 of the source terminal 1 therefore receives $N_{coop}$ acceptance messages, via the WLAN interface 14 of the source terminal. The decision module 11 then chooses, among the $N_{coop}$ terminals having transmitted an acceptance message, $N_{col}$ cooperation terminals 2, depending in particular on the number $N_L$ of video layers to be transmitted. Thus, if the number $N_L$ of video layers to be transmitted is less than or equal to the number of terminals available to transmit them (i.e. $N_{coop}+1$), the decision module 11 chooses, among the $N_{coop}$ terminals, $N_L-1$ cooperation terminals 2. If the number $N_L$ of video layers to be transmitted is greater than the number of terminals available to transmit them, the $N_{coop}$ terminals are chosen as cooperation terminals 2, and part of the video layers, which are excess layers, will either be transmitted by the source terminal 1, using a WAN connection, or not transmitted. If the source terminal 1 does not receive any acceptance message, it can choose only to transmit the base layer of the video sequence to the receiving terminal 5.

Then, in a step 27 for initiating the transmission, the decision module 11 transmits to each of the cooperation terminals 2, via the WLAN radio interface 14 of the source terminal 1, an information message containing the communication parameters necessary to transmit data streams to the receiving terminal 5 via a long-range WAN connection. For example, if this WAN connection is a WiMAX connection, these parameters comprise the throughput of the data and the type of connection (UGS or rtPS, for example). These parameters also comprise connection identifiers, such as the source and destination port numbers, and the IP address of the source terminal 1 and of the receiving terminal 5. Upon receipt of this message, the cooperation terminals 2 open, if necessary, a long-range WAN connection according to the received communication parameters.

The decision module 11 of the source terminal 1 then transmits, to the adaptation module 12 of this terminal, the set of video layers created by the video encoder 10, as well as a request indicating what improvement layers must be transmitted to the short-range WLAN interface 14, to then be sent to the cooperation terminals 2, which base layer must be transmitted towards the long-range WAN interface 13 to be sent directly to the receiving terminal 5, and what layers must be eliminated.

In response to this request, the adaptation module 12 eliminates any excess layers, transmits the non-eliminated improvement layers to the WLAN interface 14, and the base layer to the WAN interface 13.

The improvement layers are not continuously transmitted towards the cooperation terminals 2, but only during the descending frames of the WAN connection of the source terminal 1, i.e. the periods during which the source terminal 1 does not transmit at long range.

Thus, in a step 29 for WLAN transmission of the improvement layers, the WLAN interface 14 of the source terminal 1 transmits, to each cooperation terminal 2, a set of data packets of a given improvement layer, after encapsulation of said packets. Advantageously, the transmission of the packets is adjusted using the round robin: the WLAN 14 successively transmits, to each cooperation terminal 2, a packet of the improvement layer associated with that terminal, until the end of the descending frame of the WAN connection.

Moreover, the transmission of the packets is controlled by the RTCP (Real-time Transfer Control Protocol), which provides for the periodic sending, by the recipients of the packets, i.e. the cooperation terminals 2, of acknowledgement packets to the source terminal 1. In this way, the source terminal 1 can determine which terminals in fact receive the packets transmitted during step 29. The acknowledgement packets, received by the WLAN interface 14 of the source terminal 1, are transmitted to the decision module 11 of that terminal, which can decide, if one of the cooperation terminals 2 does not receive the packets whereof it is the recipient, to eliminate that terminal from the list of cooperation terminals. The decision module 11 can then choose to eliminate the improvement stream associated with that terminal, or to look for new terminals capable of cooperating, according to a new step 25 for initiating the cooperation.

Following step 29, i.e. during the ascending frame of the WAN connection of the source terminal 1, the cooperation terminals 2 transmit, during a step 31 for WAN transmission of the improvement layers, all or part of the packets received during step 29 towards the receiving terminal 5, via the network access point 3. To that end, the packets received by the WLAN interface 14 from each cooperation terminal 2 are unencapsulated by said WLAN interface 14, transmitted to the decision module 11 of the terminal, which branches these packets, via the adaptation module 12, towards the WAN interface 13 of the terminal. After encapsulation of said packets, including in particular in their header the connection identifiers received during step 27 for initiating the transmission, the WAN interface 13 transmits all or part of these packets towards the receiving terminal 5.

In parallel, in a step 33 for WAN transmission of the base layer, the WAN interface 13 of the source terminal 1 sends a set of packets of the base layer, after encapsulation of said packets, towards the receiving terminal 5, via the network access point 3.

Thus, the source terminal 1 and the cooperation terminals 2 transmit, at the same time and potentially on the same transmission channel, data towards the network access point 3. The WAN transmissions from these terminals 1 and 2 use a modulation method enabling several parallel transmissions by different terminals, for example OFDMA (Orthogonal frequency-division multiple access) modulation.

At the end of steps 31 and 33, i.e. at the end of the ascending frame of the WAN connection of the source terminal 1, the source terminal 1 transmits, during a new step 29, new packets of each improvement layer to the cooperation terminals 2, during a new descending frame of the WAN connection. This step 29 is itself followed by new steps 31 and 33 for transmitting packets towards the receiving terminal 5.

Thus, the source terminal 1 successively transmits, during the descending and ascending frames of the WAN connection, data packets from the improvement layers to the cooperation terminals 2, and data packets from the base layer to the receiving terminal 5. In parallel, each cooperation terminal 2 receives, during several steps 29, data packets from a given improvement layer, and transmits those packets towards the receiving terminal 5 as they are received.

During a step 35 for conveyance on the network, parallel to steps 31 and 33 or step 22, the network access point 3 receives the packets from each of the layers, transmitted by the source terminal 1 and the cooperation terminals 2 during steps 31 and 33, or by the source terminal 1 during only step 22, unencapsulates said packets and sends them through the network 4 to the receiving terminal 5. The latter therefore continuously receives, in a step 37 for receiving layers of video data, several streams of video data with the same source and destination.

It is thus understood from the preceding description how the transmission method according to the invention makes it possible to increase the transmission speed of a video sequence in upstream connection.

It must, however, be understood that the embodiment presented above is not limiting.

In particular, the encoding of the transmitted video sequence is not necessarily encoding according to standard H264/SVC, but can on the contrary involve any encoding making it possible to break down a video sequence into a base layer, making it possible to obtain a deteriorated video sequence, and at least one improvement layer, complementary to the base layer. Moreover, the source terminal does not necessarily include a video encoder, and the video sequence can have been encoded, before transmission thereof, by a device other than the source terminal.

Furthermore, the cooperation terminals can be different from the source terminal. In particular, the decision module of the cooperation terminals does not necessarily comprise means for initiating a cooperative transmission.

Moreover, according to another embodiment of the invention, the network access point is not unique, and the data packets are sent to the receiving terminal via several different network access points. The long-range WAN radio interface of one or more cooperation terminals can thus use a technology other than the WAN interface of the source terminal. Moreover, the network access point can itself be the recipient of the video sequence.

The transmission of the packets from the source terminal towards the cooperation terminals may not use the RTCP protocol. Advantageously, the protocol used for this transmission provides for the periodic sending of acknowledgement packets by the cooperation terminals, for example MAC acknowledgements. Moreover, if the upstream connection rate allows, the source terminal can transmit both the base layer and one or more improvement layers by its long-range WAN connection, and can transmit one or more improvement layers to each terminal.

The invention claimed is:

1. A method for transmitting a video sequence from a transmitting terminal including at least one short-range radio interface and one long-range radio interface towards at least one receiving terminal, characterized in that it comprises the following steps:
    segmenting said video sequence into a base layer making it possible to obtain a low-quality video sequence and at least one improvement layer, complementary to said base layer, and making it possible to obtain a better quality video sequence in combination with the base layer,
    transmission, by said long-range radio interface of the transmitting terminal, of at least the entire base layer towards said receiving terminal,
    transmission, by said short-range radio interface of the transmitting terminal, of at least the entire improvement layer towards at least one cooperation terminal comprising at least one short-range radio interface and one long-range radio interface,
    transmission, by said long-range radio interface of said cooperation terminal, of at least the entire improvement layer towards said receiving terminal;
    wherein said long-range radio interface of the transmitting terminal communicates according to communication frames successively comprising descending frames and ascending frames, and characterized in that said transmission by the short-range radio interface of the transmitting terminal of the improvement layer towards said cooperation terminal layer comprises a step for transmitting data towards said cooperation terminal during at least one of said descending frames, and in that said transmission by the long-range radio interface of the transmitting terminal of the base layer and said transmission, by the long-range radio interface of said cooperation terminal, of the improvement layer comprise steps for transmitting data from said base and improvement layers, respectively, during at least one of said ascending frames.

2. The transmission method according to claim 1, characterized in that the transmission by said long-range radio interface of the transmitting terminal of at least the entire base layer towards said receiving terminal and the transmission, by said long-range radio interface of said cooperation terminal, of at least all of the improvement layer towards said receiving terminal are done concomitantly.

3. The transmission method according to one of claim 1 or 2, characterized in that it also comprises a step for initiating cooperation, comprising:
    the broadcast by said short-range radio interface of the transmitting terminal of a cooperation request, and
    the transmission by the short-range radio interface of said cooperation terminal to said transmitting terminal of a cooperation acceptance message.

4. The transmission method according to claim 1 or 2, characterized in that it also comprises a step for initiating the transmission, comprising the sending by said short-range radio interface of the transmitting terminal to the cooperation terminal of a message comprising connection parameters for opening, by the cooperation terminal, of a long-range connection, and connection identifiers comprising the source and destination port numbers, and an address of the transmitting terminal and the receiving terminal.

5. The transmission method according to claim 1 or 2, characterized in that it also comprises a step for receiving said base and improvement layers by a network access point, and a step for transmission from said network access point, towards said receiving terminal, of said base and improvement layers.

6. A system for transmitting a video sequence to at least one receiving terminal, comprising a transmitting terminal including at least one short-range radio interface and one long-range radio interface, and at least one cooperation terminal including at least one short-range radio interface and one long-range radio interface, characterized in that said transmitting terminal also comprises:
    means for segmenting said video sequence into a base layer making it possible to obtain a deteriorated video sequence and at least one improvement layer, complementary to said base layer,
    means for ordering the transmission by said long-range radio interface of the transmitting terminal of at least the entire base layer towards said receiving terminal,
    means for ordering the transmission by said short-range radio interface of the transmitting terminal of at least the entire improvement layer towards said cooperation terminal, and in that said cooperation terminal comprises means for ordering the transmission, by the long-range radio interface of the cooperation terminal, of at least the entire improvement layer towards said receiving terminal;

means for generating a cooperation request and for ordering the broadcast of said request via its short-range radio interface, and in that said cooperation terminal comprises means for generating a cooperation acceptance message and for ordering transmission of said cooperation acceptance message to said transmitting terminal; and means for generating an information message containing the communication parameters necessary for the transmission by said cooperation terminal of said improvement layer and to order the transmission of said information message to said cooperation terminal.

7. The system for transmitting a video sequence according to claim 6, characterized in that the transmitting terminal also comprises means for determining the possible throughput between the long-range radio interface of the transmitting terminal and the receiving terminal.

8. The system for transmitting a video sequence according to claim 6 or 7, characterized in that said transmitting terminal also comprises means for generating an information message containing the communication parameters necessary for the transmission by said cooperation terminal of said improvement layer and to order the transmission of said information message to said cooperation terminal.

9. The transmission method according to claim 3, characterized in that it also comprises a step for initiating the transmission, comprising the sending by said short-range radio interface of the transmitting terminal to the cooperation terminal of a message comprising connection parameters for opening, by the cooperation terminal, of a long-range connection, and connection identifiers comprising the source and destination port numbers, and an address of the transmitting terminal and the receiving terminal.

* * * * *